April 12, 1927.
D. G. MAGILL
1,624,268
POURING SPOUT CONTAINER
Filed June 16, 1922
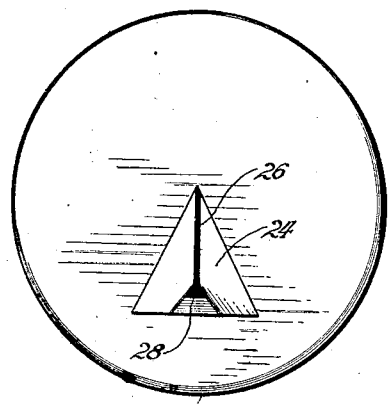
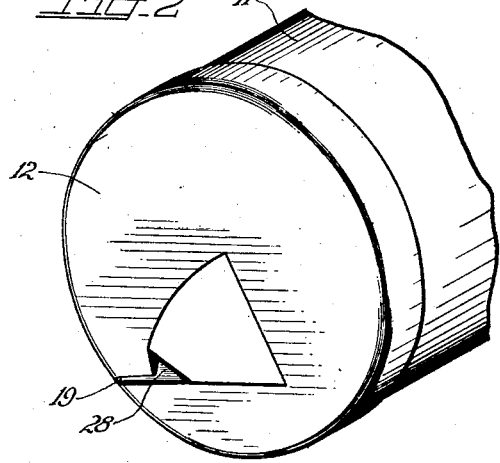
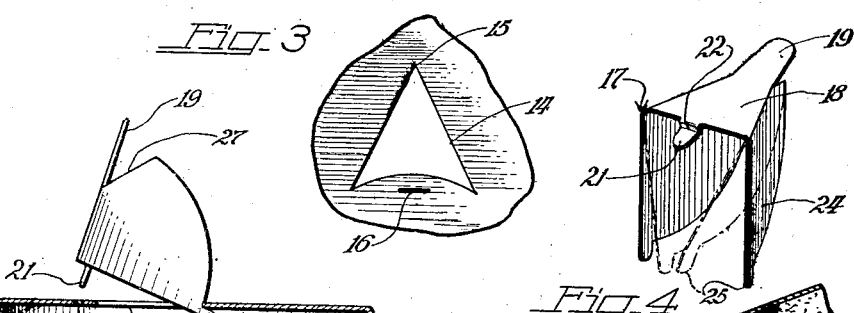
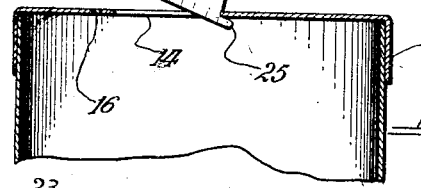
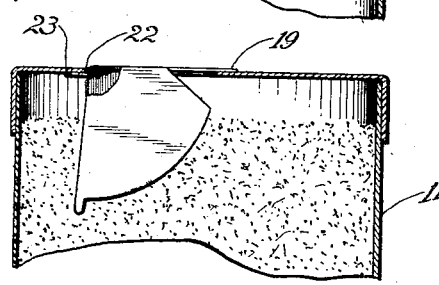
INVENTOR.
Donald G. Magill
BY Munday, Clarke &
Carpenter
ATTORNEY Patented Apr. 12, 1927.

1,624,268

UNITED STATES PATENT OFFICE.

DONALD G. MAGILL, OF BROOKLYN, NEW YORK, ASSIGNOR TO AMERICAN CAN COMPANY, OF NEW YORK, N. Y., A CORPORATION OF NEW JERSEY.

POURING-SPOUT CONTAINER.

Application filed June 16, 1922. Serial No. 568,760.

The present invention has general reference to containers of the pouring spout variety and has for a particular object the provision in a container adapted for the packaging of salt, or like material, of a spout which is effectively held in desired position and which is provided with a restricted outlet opening.

To this end, the invention contemplates the provision of a spout of sheet metal, celluloid, or the like, having divergent wings adapted to engage the sides of a pouring opening to cause the spout to close said opening when in closed position and to prevent the escape of any of the contents, except through the intended outlet and, in connection with this construction, the provision of means for restricting the outlet opening to permit the pouring of a stream of limited size and to prevent spilling when the spout is in pouring position.

A further and important object of the invention is the provision of improved means for connecting the spout to the container wall so arranged as to facilitate assembling of the parts and action thereof.

Other objects and advantages of the invention will be apparent as it is better understood from the following description, which, taken in connection with the accompanying drawings, discloses a preferred embodiment thereof.

Referring to the drawings,

Figure 1 is a top plan view of a container in which my invention is embodied, the spout being shown in open position;

Fig. 2 is a perspective view thereof;

Fig. 3 is a detail plan view of a portion of the container top, showing the outlet opening;

Fig. 4 is a perspective view of the spout showing, in full lines, the position of the wings when the spout is in closed position and in dotted lines the position thereof when in open, or pouring position;

Fig. 5 is a transverse section through the container top, showing the first position of the spout in assembling;

Fig. 6 is a sectional view through the container top, showing the spout in pouring position; and Fig. 7 is a sectional view, showing the filled container in upright position and with the spout closed.

The container as shown on the drawings, for purposes of illustration, comprises a body part 11, which preferably is constructed of paper, or other fibrous material, and a slip closure 12, which is provided with a depending flange 13 adapted to frictionally engage the top of the body 11.

In the top wall is a pouring opening 14, which is of tapered form, the sides thereof intersecting at the point 15. At the base of the opening, i. e., the side opposite the point 15, there is provided a slot 16, adapted to receive a part of the spout to retain the latter in assembled relationship with the container. The spout, generally indicated by the reference character 17, is provided with a top wall 18, the front of which terminates in a lip, or finger piece 19, adapted to overlie the container wall and limit inward movement of the spout, and from the rear of the wall 18, a tang 21 protrudes and is adapted to be inserted in the slot 16. This tang is offset, as indicated at 22, which provides a vertical portion adapted to extend through the container wall when the spout is closed and a horizontal extension 23, adapted to lie against the under side of said wall (Fig. 7).

It will be evident that the opening and closing movement of the spout merely results in movement of the tang 21 around the slot 16 (Fig. 6 compared with Fig. 7) and does not necessitate a bending of the fiber wall with the resultant likelihood of breaking the latter.

Side wings 24 are arranged to extend at an angle from the top wall 18 and are provided at their rear ends with stops 25, adapted to limit the opening movement of the spout (Fig. 6). It will be apparent from the foregoing that the spout may be positioned by first inserting the ends of the wings upon which the stops, or projections 25 are provided in the main opening (Fig. 5), and then inserting the tang 21 in the slot 16 and pressing the top wall, or the finger piece 19, downwardly to force the wings inside the container.

The wings 24, being of resilient material, are adapted to diverge within the container, thus preventing spilling of the contents by providing a closs frictional contact between the wings and the sides of said pouring opening. The form of the opening, however, is adapted to cause convergence of the wings in the opening movement of the spout, so that the inner edges of said wings are in contact, as indicated at 26 (Fig. 1). The outer ends of the wings 26 are cut back at 27, to provide an opening 28 above the lip 19, which opening is restricted by the convergence of the wings 24 with the movement of the spout to open position.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A pouring spout for salt and like containers, comprising three walls shaped from a single blank, the free edges of two of said walls joining each other and forming a pouring chamber closed at the top when the spout is moved in pouring position.

2. A pouring spout for salt and like containers, comprising a three walled chamber closed at the top when in pouring position, two of said walls being notched to form a restricted pouring opening.

3. A pouring spout for salt and the like containers comprising a piece of material bent into three walls, the free edges of two of said walls joining each other and forming with the third wall a pouring funnel substantially closed at the top and of three sided pyramidal shape.

4. A pouring spout container, comprising a body having a wall provided with a tapered pouring opening and a pouring spout inserted in said opening and having a hinging retaining connection with said wall, said spout having a top part adapted to fit and close the pouring opening and having resilient wings extending inwardly from said top, said wings being adapted to be forced together by the tapering walls of the spout opening to provide a pouring chamber.

5. A container having a spout hinged about a tapered pouring opening in one of the walls of said container, said spout having a top member adapted to close said opening and two side wings spread apart when within said container and pressed into contact with each other by said tapered opening and forming a restricted pouring funnel when without said container.

6. A pouring spout container, comprising a body having a wall provided with a tapered pouring opening, a pouring spout inserted in said opening and hinged to said wall, said spout having inwardly extending wings which are caused to contact with each other along their edges by the opening movement of the spout in said tapered pouring opening, and the outlet at the end of said spout being restricted by the convergence of said wings.

DONALD G. MAGILL.